US012454800B2

(12) United States Patent
Zhuang et al.

(10) Patent No.: US 12,454,800 B2
(45) Date of Patent: Oct. 28, 2025

(54) INTELLIGENT CONSTRUCTION CONTROL METHOD, APPARATUS AND SYSTEM FOR MIXING PILE WITH SPLIT-GROUTING

(71) Applicants: SHANDONG UNIVERSITY, Jinan (CN); SHANDONG HI-SPEED GROUP CO, LTD, Jinan (CN)

(72) Inventors: Peizhi Zhuang, Jinan (CN); Chuanyi Ma, Jinan (CN); Mingpeng Liu, Jinan (CN); Jialiang Zhang, Jinan (CN); Ning Zhang, Jinan (CN); Yuanshun Qian, Jinan (CN); Chaoji Li, Jinan (CN); Shengtao Zhang, Jinan (CN); Kangxu Wang, Jinan (CN); Xiuguang Song, Jinan (CN); Haoxiang Li, Jinan (CN)

(73) Assignees: SHANDONG UNIVERSITY (CN); SHANDONG HI-SPEED GROUP CO, LTD (CN)

( * ) Notice: Subject to any disclaimer, the term of this patent is extended or adjusted under 35 U.S.C. 154(b) by 5 days.

(21) Appl. No.: 18/743,175

(22) Filed: Jun. 14, 2024

(65) Prior Publication Data
US 2025/0223770 A1 Jul. 10, 2025

(30) Foreign Application Priority Data
Jan. 8, 2024 (CN) .......................... 202410033776.7

(51) Int. Cl.
*E02D 5/36* (2006.01)
*E02D 7/24* (2006.01)
*E02D 15/04* (2006.01)

(52) U.S. Cl.
CPC ................. *E02D 5/36* (2013.01); *E02D 7/24* (2013.01); *E02D 15/04* (2013.01)

(58) Field of Classification Search
CPC .............. E02D 5/36; E02D 7/24; E02D 15/04
See application file for complete search history.

(56) References Cited

U.S. PATENT DOCUMENTS 10,119,240 B2 * 11/2018 Zhang ..................... E02D 33/00
2023/0058683 A1 * 2/2023 Braz ...................... G06Q 10/06

FOREIGN PATENT DOCUMENTS

CN 117350148 A 1/2024
JP 2023003193 A * 1/2023
(Continued)

OTHER PUBLICATIONS

Li Yu , Wang Li , Zhou Zhiping, et al., Research on Patent Value Evaluation Method Based on Random ForestAlgorithm Improved by DBSCAN Clustering, Science Technology and Engineering, Issue 14, 2020, China Academic Journal Electronic Publishing House, Shanghai, China.

*Primary Examiner* — Kyle Armstrong

(57) ABSTRACT

The present invention provides an intelligent construction control method, apparatus, and system for splitting jet grouting mixing piles, relating to geotechnical engineering. The method includes receiving real-time perception information from a construction information self-perception system, which includes drilling depth, drilling rig output power, drill bit torque, drill rod axial force, and pore water pressure of the drill bit. This information is input into a trained machine-learning model for stratum information, establishing a nonlinear implicit correspondence relationship between the perception information and construction stratum conditions, and outputting real-time stratum state information. The real-time stratum state information is then input into a trained self-matching machine-learning model for optimal construction parameters, establishing a nonlinear implicit correspondence relationship between the stratum state information and optimal construction parameters, and (Continued)

outputting current optimal construction parameters. This invention enables real-time intelligent inversion of stratum information and dynamic self-optimization control of construction parameters.

9 Claims, 4 Drawing Sheets

(56) References Cited

FOREIGN PATENT DOCUMENTS

| | | | | | |
|---|---|---|---|---|---|
| KR | 20210101558 A | * | 8/2021 | ............. | G06N 20/00 |
| WO | WO-2010028532 A1 | * | 3/2010 | ............... | E02D 3/12 |

* cited by examiner

INTELLIGENT CONSTRUCTION CONTROL METHOD, APPARATUS AND SYSTEM FOR MIXING PILE WITH SPLIT-GROUTING

TECHNICAL FIELD

The present invention belongs to the technical field of geotechnical engineering, and particularly relates to an intelligent construction control method, apparatus and system for mixing piles with split-grouting.

BACKGROUND ART

The statements in this section merely provide information for background art related to the present invention and do not necessarily constitute the prior art.

Cement mixing piles usually have the advantages of simple construction process, wide application in various soil types, and deep reinforcement depth, etc. It can be used to treat saturated soft clay (e.g., silt, silty soil, sandy soil and peat soil) formed by various origins, as well as cohesive soil with a high water content and the bearing capacity of a foundation smaller than or equal to 120 kPa. However, a large number of practices have proved that when the content of clay particles in the cohesive soil is high (i.e., large plasticity index), cement slurry is squeezed out from a slurry outlet of a drill bit at low pressure and flow rate, resulting in the difficulty of stirring into a soft cohesive soil layer. Therefore, it is prone to causing the problems of pile body mixing with mud and cement slurry blocks, serious loss of cement slurry, and stirring ununiformly, which seriously affects pile quality and reinforcement effect.

To solve the above problems, splitting mixing piles are often used in a practical project. Splitting cement-soil mixing piles made two major improvements on a traditional cement-soil mixing pile: the first is to change a large-diameter slurry outlet into two symmetrical small-diameter nozzles; and the second is to change a low-pressure mud pump into a high-pressure mud pump. When the cement slurry is ejected out from the nozzles at high pressure, a cutting and splitting effect can be generated to a clay layer (similar to high-pressure jet grouting of a single-tube method), which forces the cement slurry to be mixed into the soft clay. Furthermore, the cement slurry can be mixed into the soft clay more evenly with the additional effect of a stirring rod, which solves the common quality problems of traditional cement-soil mixing piles. However, splitting cement-soil mixing piles still have disadvantages and the limitations in current engineering application.

Firstly, complex geology for the position of splitting mixing piles leads to the inability of obtaining the real-time information of the stratum during construction. Secondly, splitting cement-soil mixing piles are greatly affected by the construction environment and is strongly dependent on the artificial experiences; and construction parameters cannot be optimized according to actual working conditions, thereby lowering the construction quality and efficiency. Besides, the shortage of intelligent level for current splitting mixing piles caused the waste of human resource, difficulty in ensuring the construction quality, and low efficiency, etc.

Therefore, current splitting and jet grouting cement mixing piles cannot satisfy the practical requirements. It is urgent for a real-time intelligent inversion method integrating geology information and dynamic self-optimization control on construction parameters, and to develop intelligent construction equipment for splitting mixing piles to solve the above problems.

SUMMARY

To overcome the deficiencies in the prior art, the present invention provides an intelligent construction control method, apparatus and system for splitting jet grouting mixing piles, which is capable of performing real-time intelligent inversion on stratum information and further performing dynamic self-optimization control on construction parameters, and developed a set of intelligent construction equipment for splitting mixing piles to solve the problems in the prior art.

In order to achieve the above purpose, one or more embodiments of the present invention provide the following technical solutions:

In the first aspect of the present invention, an intelligent construction control method for splitting jet grouting mixing piles is provided.

The intelligent construction control method for splitting jet grouting mixing piles includes the following steps:

receiving the real-time perception information from a construction information self-perception system, where the real-time perception information includes drilling depth, output power of a drilling rig, torque of a drill bit, axial force of a drill rod and pore water pressure of the drill bit;

inputting the real-time perception information into the trained machine-learning model for stratum information, establishing a nonlinear implicit correspondence between the real-time perception information and construction stratum conditions, and then outputting real-time stratum state information;

inputting the real-time stratum state information into the trained self-matching machine-learning model for optimal construction parameters, establishing a nonlinear implicit correspondence between the real-time stratum state information and optimal construction parameters, and then outputting current optimal construction parameters.

Optionally, the drilling depth and the output power of the drilling rig are obtained from the drilling rig; and the torque of the drill bit, the axial force of the drill rod, and the pore water pressure of the drill bit are obtained from torque sensors, force sensors, and pore water pressure sensors, respectively.

Optionally, training the machine-learning model for stratum information specifically includes:

building a random forest-DBSCAN integration model;

obtaining existing geological state information and experimental data, and labeling the stratum state information corresponding to the drilling depth in a classification manner;

inputting the experimental data and the labeled stratum state information into the random forest-DBSCAN integration model, and clustering the experimental data using a DBSCAN algorithm to train a random forest model;

evaluating and optimizing the model using a validation set or a cross validation method to obtain the trained machine-learning model for stratum information, namely the trained random forest-DBSCAN integration model;

inputting the real-time perception information into the trained random forest-DBSCAN integration model to obtain an estimated value of the real-time stratum state information.

Optionally, the self-matching machine-learning model for optimal construction parameters is expressed as a mapping between multi-inputs and multi-output:

$$f: G = f(s)$$

where s is an input vector (i.e., stratum condition), $s=(\alpha_1, \alpha_2, \ldots \alpha_n)$, and $\alpha_1-\alpha_n$ represents real-time stratum state information components; and G is an output vector (i.e., optimal construction parameter combination), $G=(\beta_1, \beta_2, \ldots \beta_n)$, and $\beta_1-\beta_n$ represents output components.

Optionally, training a self-matching machine-learning model for optimal construction parameters specifically includes:

obtaining an optimal construction parameter database to pretreat data;

using the labeled stratum state information as target variables, evaluating the correlation degrees between features and target variables using a chi-square test, and selecting first M features with the highest correlation degrees and standardizing the features;

dividing the optimal construction parameter database into n datasets with similar sizes using a K-fold cross validation method;

selecting a user-defined polynomial kernel function for an SVM class model, and building the self-matching machine-learning model for optimal construction parameters;

performing K-round training to evaluate on the built construction parameter self-matching model, where n−1 datasets in each round are used for training, and the remaining dataset is used as a test set, and finally calculating the average value among K-round evaluation results as a performance index of the model, and performing a next round of training if requirements are not met until the end of training; and inputting the real-time stratum state information into the trained self-matching machine-learning model for optimal construction parameters, and obtaining predicted optimal construction parameters through forward propagation.

Optionally, the optimal construction parameter database is the splitting pile construction parameters, including the water-cement ratio, mud dosage, guniting pressure, grouting speed, drilling speed, lifting speed of a drill rod and rotating speed of a fan blade, obtained from the cloud platform under typical stratum conditions.

Optionally, the intelligent construction control method for splitting jet grouting mixing piles further includes:

inputting the current matched optimal construction parameters into a construction parameter intelligent adjustment system, and dynamically adjusting the construction parameters to achieve intelligent control of a construction process.

In a second aspect of the present invention, an intelligent construction apparatus for mixing piles with split-groutings is provided.

The intelligent construction apparatus for splitting jet grouting mixing piles includes a construction information self-perception system, a control apparatus, and a construction parameter intelligent adjustment system.

The construction information self-perception system includes a drilling rig and multi-source sensing components, where the drilling rig is used for detecting drilling depth and output power of the drilling rig and the multi-source sensing components are used for acquiring data of torque of a drill bit, axial force of a drill rod and pore water pressure of the drill bit.

The control apparatus is used for predicting, outputting, and displaying the real-time stratum state information based on detections from the construction information self-perception system, and then outputting current optimal construction parameters based on the real-time stratum state information.

The construction parameter intelligent adjustment system is used for real-time controlling to a variable-frequency and variable-speed pressure adjusting device based on the current optimal construction parameters.

Optionally, the multi-source sensing components include a torque sensor and a pore water pressure sensor which are mounted at the drill bit, and an axial force sensor mounted at the bottom of the drill rod; the variable-frequency and variable-speed pressure adjusting device includes a drilling driving motor and a high voltage variable frequency pump, where the drilling driving motor is used for controlling drilling speed, lifting speed of the drill rod and rotating speed of a fan blade; and the high voltage variable frequency pump is used for controlling guniting pressure and grouting speed.

In a third aspect of the present invention, an intelligent construction control system for splitting jet grouting mixing piles is provided.

The intelligent construction control system for splitting jet grouting mixing piles includes:

a real-time perception information acquisition module, configured to: receive real-time perception information from construction information self-perception system, where the real-time perception information includes data of drilling depth, output power of a drilling rig, torque of a drill bit, axial force of a drill rod and pore water pressure of the drill bit;

a real-time stratum state information prediction module, configured to: input the real-time perception information into the trained machine-learning model for stratum information, establish a nonlinear implicit correspondence between the real-time perception information and construction stratum conditions, and output real-time stratum state information;

a current optimal construction parameter acquisition module, configured to: input the real-time stratum state information into a trained self-matching machine-learning model for optimal construction parameters, establish a nonlinear implicit correspondence between the real-time stratum state information and optimal construction parameters, and output current optimal construction parameters.

One or more of the above technical solutions have the following beneficial effects:

the present invention provides the intelligent construction control method, apparatus and system for splitting jet grouting mixing piles. Accurate soil layer state parameters are synchronously inverted by perceiving various preferred parameters in the whole construction process in real time; and then various construction parameters during pile formation are controlled and optimized in real time according to the inverted soil layer state parameters, so as to improve the effect of the splitting jet grouting mixing piles on treatment and reinforcement of the soft foundation.

In the present invention, during the training of machine-learning model for stratum information, the DBSCAN algorithm is integrated based on a general random forest model, and used for clustering real-time perception information data; and then a clustering result is used as the data feature, which reduces the quantity of irrelevant feature, thereby reducing model complexity and improving calculation accuracy, and then overcoming the disadvantage of the poor effect of processing high-dimensional sparse data a traditional random forest model.

The self-matching machine-learning model for optimal construction parameters is an SVM class model. A kernel function of the model is the user-defined polynomial kernel function, which well overcomes the disadvantages of operation complexity and low calculation speed of general kernel functions, therefore satisfy the requirements for real-time inversion of engineering.

Additional advantages of the present invention will be given in parts in the following descriptions. Parts become obvious from the following descriptions or be learned from the practice of the present disclosure.

BRIEF DESCRIPTION OF THE DRAWINGS

The accompanying drawings as a part of the present invention are included to provide a further understanding of the present invention. Exemplary embodiments of the present invention and description thereof are adopted to illustrate the present invention, and not intended to form improper limitations to the present invention.

Figure 1:
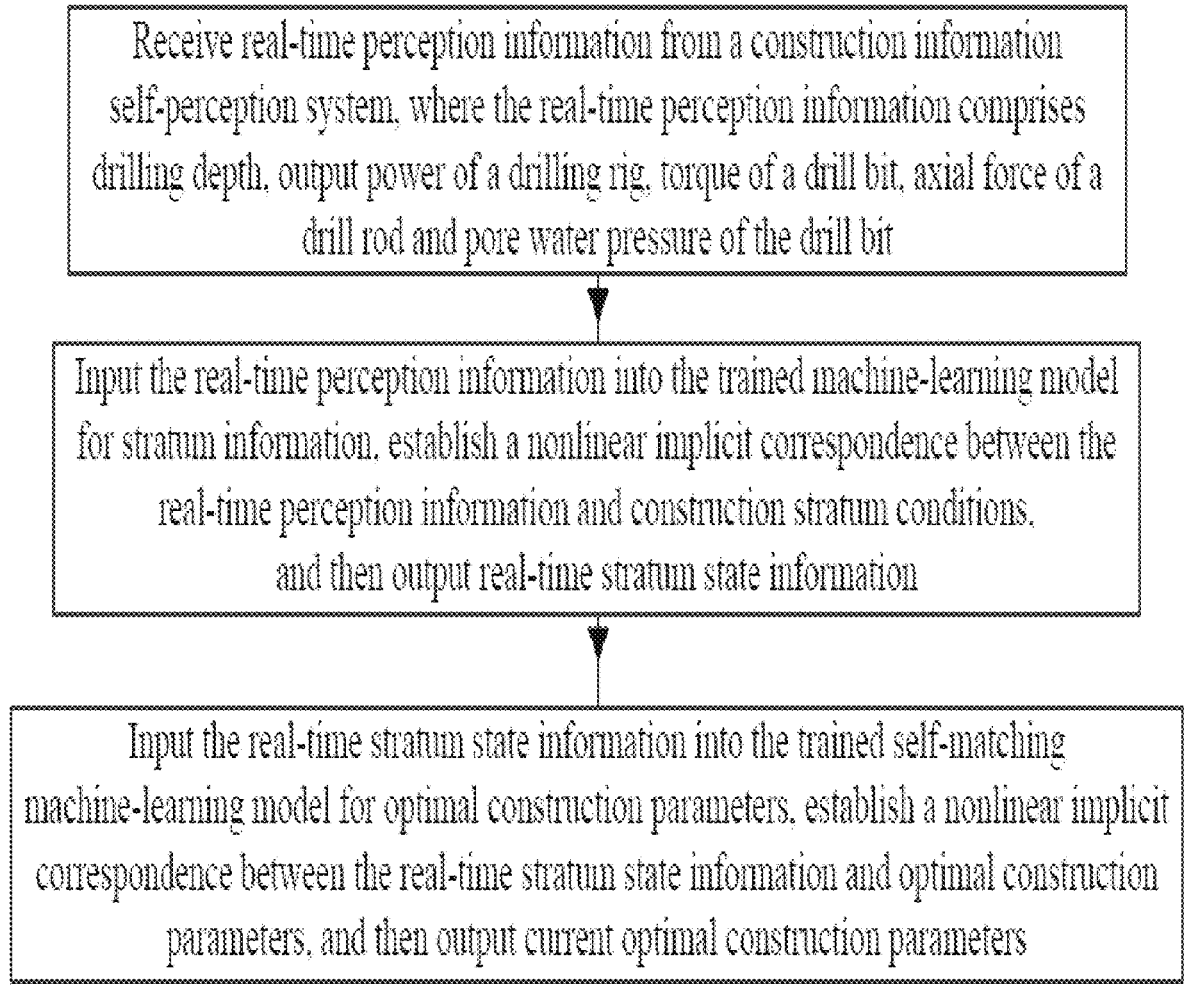
FIG. 1 is a flow chart of a method of the first embodiment.
Figure 2:
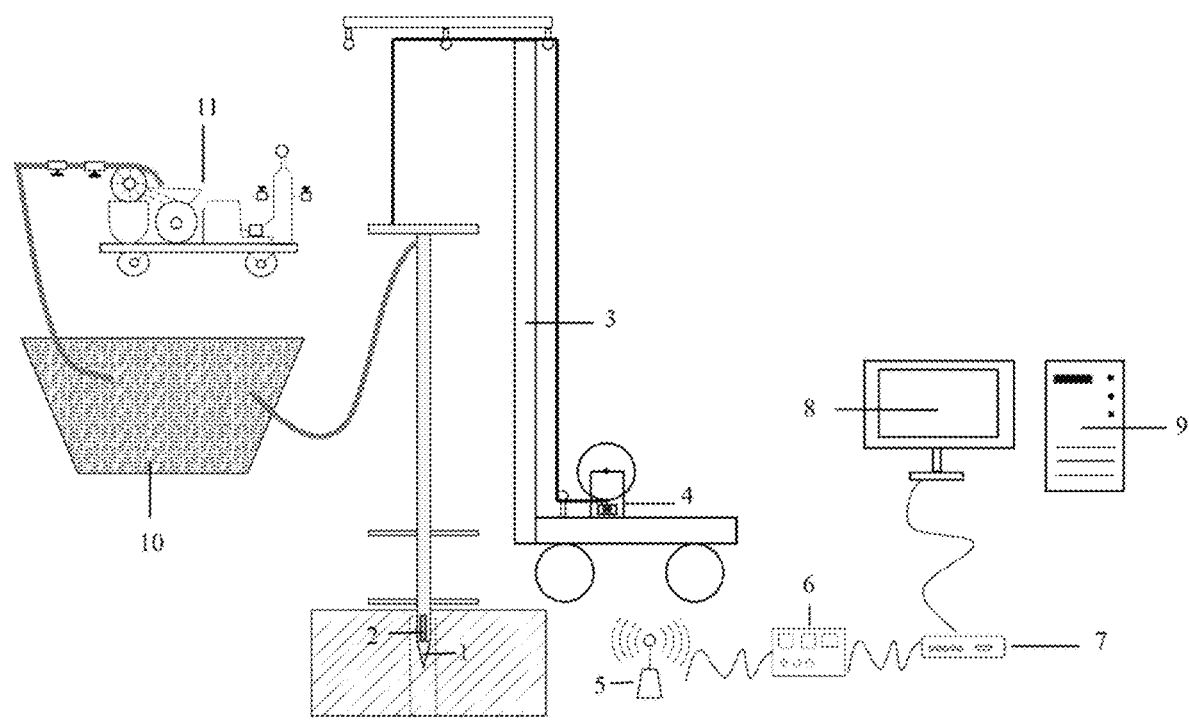
FIG. 2 is a schematic structural diagram of machine-learning model of the first embodiment.

In the figures, a list of components represented by various reference numerals is as follows:

multi-source sensing probe 1; multi-source sensing component 2; erecting beam 3; variable speed driver 4; wireless data transceiver 5; line concentrator 6; single-chip microcomputer 7; display 8; workstation 9; slurrying station 10; variable frequency grouting pump 11.

DETAILED DESCRIPTION OF THE EMBODIMENTS

It should be pointed out that the following detailed explanations are exemplary, aiming to provide further explanation of the present invention. Unless otherwise specified, all technical and scientific terms used herein have the same meanings with those commonly understandings by general skilled workers belonged to the described technology region.

It should be noted that the terms used herein are only for describing embodiments, instead of intending to limit exemplary embodiments to the present invention.

Without conflict, the embodiments of the present invention and the features in the embodiments can be combined with each other.

Embodiment I

The embodiment discloses an intelligent construction control method for splitting jet grouting mixing piles.

As shown in FIG. 1, the intelligent construction control method for splitting jet grouting mixing piles includes the following steps:

receiving the real-time perception information from a construction information self-perception system, where the real-time perception information includes drilling depth, output power of a drilling rig, torque of a drill bit, axial force of a drill rod and pore water pressure of the drill bit;

inputting the real-time perception information into the trained machine-learning model for stratum information, establishing a nonlinear implicit correspondence between the real-time perception information and construction stratum conditions, and then outputting real-time stratum state information;

inputting the real-time stratum state information into the trained self-matching machine-learning model for optimal construction parameters, establishing a nonlinear implicit correspondence between the real-time stratum state information and optimal construction parameters, and then outputting current optimal construction parameters;

inputting the current matched optimal construction parameters into the construction parameter intelligent adjustment system, and dynamically adjusting the construction parameters to achieve intelligent control of a construction process.

In order to accurately invert stratum state information in real time, a DBSCAN algorithm is integrated based on a general random forest model in the embodiment, thereby overcoming the disadvantage of the poor effect of processing high-dimensional sparse data a traditional random forest model, which is specifically as follows:

1) the DBSCAN algorithm is used for clustering the real-time perception information data, and then a clustering result is used as the data feature, which reduces the quantity of irrelevant feature, thereby reducing model complexity and improving calculation accuracy;

2) a stratum state (stratum type, lithology or aquiclude) corresponding to drilling depth is labeled in a classification manner according to existing geological state information and experimental data;

3) the labeled stratum state information is used as a target variable, and features and stratum state information are input into a random forest-DBSCAN integration model for training;

4) the model is evaluated and optimized by using a validation set or a cross validation method; different feature combinations, model parameters and algorithms can be tried to improve accuracy and generalization ability of the model, and the trained machine-learning model for stratum information is obtained (i.e., the trained random forest-DBSCAN integration model); and 5) the real-time perception information is inputted into the trained random forest-DBSCAN integration model to obtain an estimation of the real-time stratum state information.

inputting the real-time stratum state information into an appropriate self-matching machine-learning model for optimal construction parameters, establishing the nonlinear implicit correspondence between the real-time stratum state information and the optimal construction parameters, and outputting current optimal construction parameters; specific details are as follows:

1) data preprocessing: data outliers are removed based on a statistical analysis method, and a regression interpolation method is used to fill local sparse data;

2) feature selection and standardization: a correlation degree between the features and target variables is evaluated using a chi-square test method, and five features with the highest correlation degree are selected, and the selected five features are converted to a normal distribution with a mean value of 0 and a variance of 1 using a Z-score standardization method, to make them comparable;

3) data division: to better evaluate the generalization ability and performance of the model, a database is divided into n datasets with approximate sizes using a K-fold cross validation method;

4) user-defined kernel function: as this model involves a nonlinear parameter optimization problem based on high-dimensional data and has high requirements for operation efficiency of the model, a user-defined polynomial kernel function is developed to map the data to a high-dimensional feature space to ensure the calculation accuracy and improve the calculation speed, therefore transferring nonlinear problems to linear problems;

5) model training and evaluating: performing K-round training to evaluate on the built construction parameter self-matching model, where n−1 datasets in each round are used for training, and the remaining dataset is used as a test set, and finally calculating the average value among K-round evaluation results as a performance index of the model, and performing next round of training if not meet the requirement until the end of training; and; and 6) optimal construction parameters prediction: the real-time stratum state information is inputted into the trained self-matching machine-learning model for optimal construction parameters, and predicted optimal construction parameters are obtained through forward propagation.

In the embodiment, the self-matching machine-learning model for optimal construction parameters is a specially designed SVM class model. The kernel function of the model is the user-defined polynomial kernel function, which well overcomes the disadvantages of operation complexity and low calculation speed of general kernel functions, therefore satisfy the requirements for real-time inversion of engineering.

The above control method is as follows:
after receiving the real-time perception information from a construction information self-perception system, various data are processed and analyzed in real time, and soil layer conditions during construction are simultaneously inverted. The process is completed by the pre-trained machine-learning model for stratum information.

Train the machine learning model through an actual engineering geological database to improve the calculation accuracy. Various parameter data collected from the construction self-perception parameter system are used as an input layer of the model, and the nonlinear implicit correspondence between the real-time perception information and the construction stratum conditions is established. The real-time stratum conditions are assumed as an output layer of the model, and the stratum information is inverted in real time.

After obtaining the real-time inverted stratum information, it is necessary to synchronously match the optimal construction parameters during construction and dynamically adjust the actual construction parameters for a piling machine through an intelligent control device to reach optimal values. The process is completed by the pre-trained self-matching machine-learning model for optimal construction parameters.

The self-matching machine-learning model for optimal construction parameters is trained with an optimal construction parameter database to obtain the well-trained machine-learning model for optimal construction parameters. The optimal construction parameter database is self-updated and continuously optimized using a big data technology; a construction parameter matching model is expressed as an implicit multi-point mapping relationship using a machine-learning algorithm, so as to determine an optimal construction parameter combination under current construction stratum conditions; and current construction parameters are controlled and adjusted to the optimal values in real time by an intelligent control system.

More specifically, the optimal construction parameter database is the splitting pile construction parameters, including the water-cement ratio, mud dosage, grouting pressure, grouting speed, drilling speed, lifting speed of the drill rod and rotating speed of a fan blade, obtained from a cloud platform under typical stratum conditions. The database can be continuously updated and developed based on the cloud platform.

An optimal construction parameter self-matching system is constructed by an artificial machine learning; and the construction parameter matching model is expressed as a multi-input and multi-output mapping relationship, and specifically expressed as:

$$f: G = f(s)$$

where s is an input vector (i.e., stratum condition), $s=(\alpha_1, \alpha_2, \ldots \alpha_n)$, and $\alpha_1$-$\alpha_n$ represents real-time stratum state information components; and G is an output vector (i.e., optimal construction parameter combination), $G=(\beta_1, \beta_2, \ldots \beta_n)$, and $\beta_1$-$\beta_n$ represents output components.

After obtaining the output from the self-matching machine-learning model for optimal construction parameters, the optimal construction parameters are received by the construction parameter intelligent adjustment system; and the construction parameters are controlled in real time by a variable-frequency and variable-speed pressure adjusting device, so as to achieve intelligent control of a construction process and ensure the construction process consistent with the optimal construction parameters.

Embodiment II

The embodiment discloses an intelligent construction apparatus for mixing piles with split-grouting.

Figure 3:
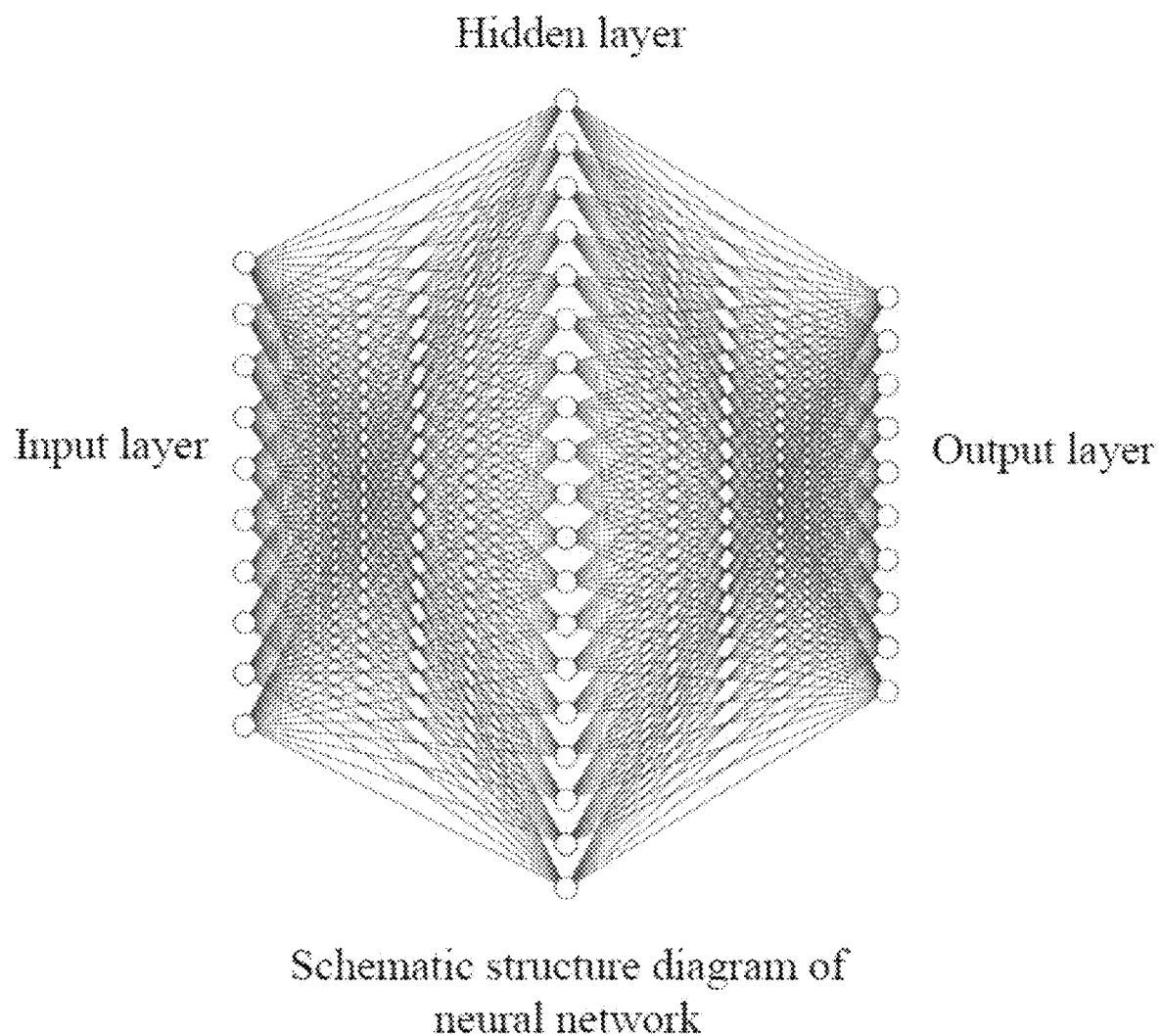
FIG. 3 is an overall structure diagram of the second embodiment.

As shown in FIG. 3, the intelligent construction apparatus for splitting jet grouting mixing piles includes a construction information self-perception system, a control apparatus, and a construction parameter intelligent adjustment system.

The construction information self-perception system includes a drilling rig and multi-source sensing components, where the drilling rig is used for detecting drilling depth and output power of the drilling rig and the multi-source sensing components are used for acquiring data of torque of a drill bit, axial force of a drill rod and pore water pressure of the drill bit.

The control apparatus is used for predicting, outputting, and displaying the real-time stratum state information based on detections from the construction information self-perception system, and then outputting current optimal construction parameters according to the real-time stratum state information.

The construction parameter intelligent adjustment system is used for real-time controlling to a variable-frequency and variable-speed pressure adjusting device based on the current optimal construction parameters.

Specifically, the intelligent construction control system for splitting jet grouting mixing piles provided by the embodiment includes: the construction information self-perception system, a stratum information real-time inversion system, and a construction parameter dynamic self-optimization system.

The construction information self-perception system, including the drilling rig, the multi-source sensing components, and a wireless data transmission platform, has a function of perceiving various soil state parameters and construction parameter data in real time during pile construction. During construction, a construction information system collects various data synchronously and sends the data to the stratum information real-time inversion system through the wireless data transmission platform, so as to perform next data processing and analysis.

The drilling rig is a high pressure stirring drilling rig, capable of monitoring the drilling depth and the output power of the drilling rig in real time. The multi-source sensing components are vibrating-wire sensors, including a torque sensor and a pore water pressure sensor mounted at the drill bit, and an axial force sensor mounted at the bottom of the drill rod.

The drilling depth, and the torque, the axial force, the pore water pressure and the output power of the drilling rig in a drilling process are perceived in real time through the drilling rig and the multi-source sensing components; and the drilling depth, the torque, the axial force, the pore water pressure and the output power are used as input parameters for stratum inversion.

The wireless data transmission platform includes a wireless transceiver chip, a low-power single-chip microcomputer, a line concentrator and a receiving terminal module, and is used for receiving sensor data and transmitting the sensor data to a terminal system.

The used single-chip microcomputer is an embedded ultra-low-power single-chip microcomputer with the advantages of fast operation, strong stability, and low consumption rate.

The used line concentrator is a stackable line concentrator, which regenerates and expands the received signal, so as to expand a transmission interval of a network and quickly transmit port data to the terminal system.

A terminal computer is used for receiving a sensor signal, displaying sensor data, and inputting the data into the stratum information real-time inversion system.

The intelligent control system includes the variable-frequency and variable-speed pressure adjusting device and the construction parameter intelligent adjustment system.

The variable-frequency and variable-speed pressure adjusting device includes a drilling driving motor and a high voltage variable frequency pump, where the drilling driving motor is used for controlling drilling speed, lifting speed of the drill rod and rotating speed of a fan blade; and the high voltage variable frequency pump is used for controlling grouting pressure and grouting speed.

As shown in FIG. 3, the drill rod is connected to an erecting beam; the multi-source sensing components are arranged on the drill rod; multi-source sensing probes are arranged on the drill bit; a variable frequency grouting pump is connected to a slurrying station through a pipeline; the drill rod is connected to the slurrying station through a pipeline; a variable frequency driver drives the drilling rig and the fan blade; the multi-source sensing components and the multi-source sensing probes are connected to the line concentrator through a wireless data transceiver; the line concentrator is connected to the single-chip microcomputer; and the single-chip microcomputer is connected to a display.

The single-chip microcomputer is used for storing the information of the trained machine-learning model for stratum information to establish a nonlinear implicit correspondence between the real-time perception information and construction stratum conditions, and output real-time stratum state information.

The intelligent control system further includes a workstation computer. The workstation computer is in communication connection to the single-chip microcomputer. In the embodiment, the workstation computer is used for storing the self-matching machine-learning model for optimal construction parameters, receiving the predicted real-time stratum state information, and acquiring the current optimal construction parameters based on the self-matching machine-learning model for optimal construction parameters.

Figure 4:
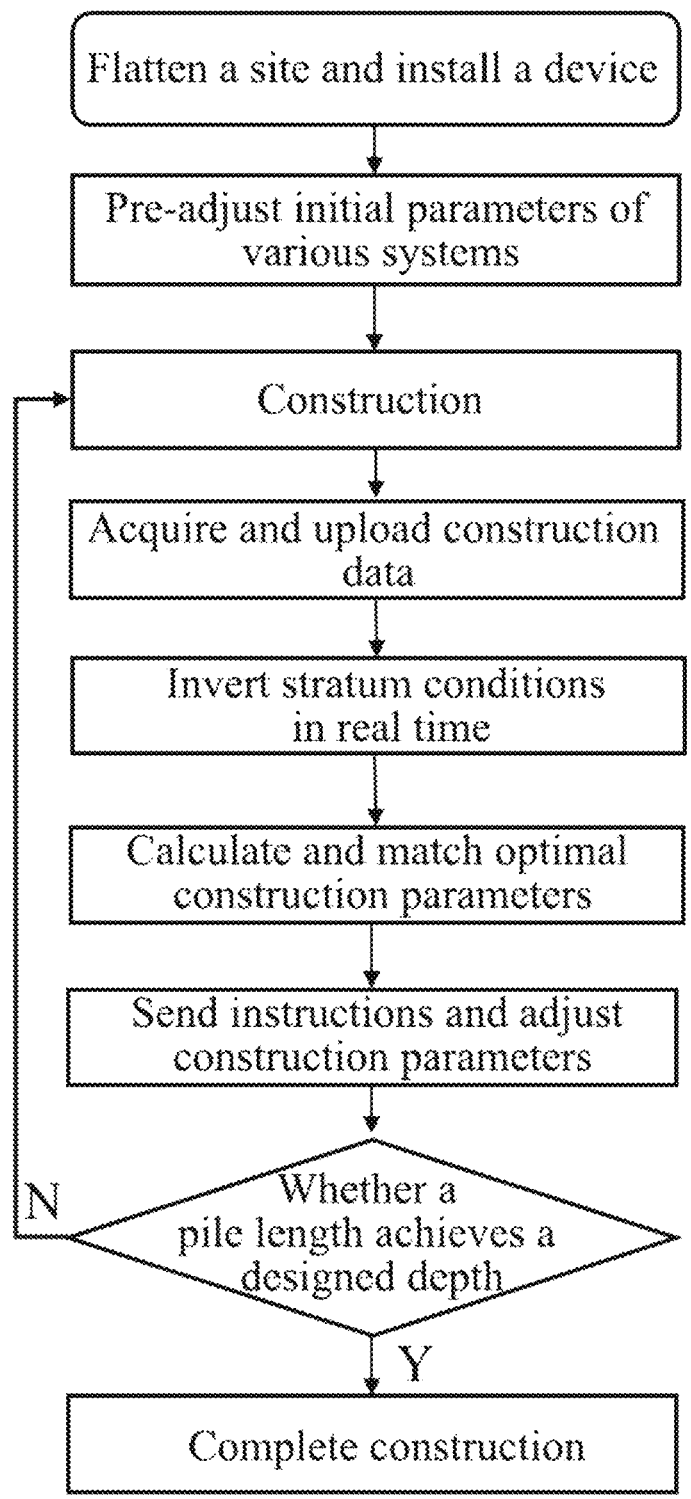
FIG. 4 is a schematic flowchart of the construction process of the present invention.

As shown in FIG. 4, a construction technology based on the intelligent construction apparatus for splitting jet grouting mixing piles in the embodiment includes the following steps:

1. the multi-source sensing components are mounted on the drilling rig, the sensors are calibrated, and a mobile slurrying station is built;
2. the drilling rig is moved to a specified position, the drill bit is aligned to the center of a hole, and the drilling rig is leveled at the same time for smooth and horizontal placement;
3. a hole is drilled in the specified position, and the drilling depth, the drilling speed, soil pressure, the pore water pressure and other perception parameters are monitored in real time by the drilling rig using the multi-source sensing components during construction process;
4. the wireless sensor platform receives information data collected from multi-source sensors in real time and uploads the information data to the terminal computer;
5. the received data is input into the stratum inversion model, so as to invert a stratum state information combination (a type, strength, a water content, a permeability coefficient, etc. of a soil layer) in real time;
6. the predicted stratum state information combination is input into an optimal construction parameter self-matching system in the workstation computer, and is matched with optimal construction parameters combination based on an optimal construction parameter database;
7. the matched optimal construction parameters combination is input into the construction parameter intelligent adjustment system in a workstation, and construction parameters are dynamically adjusted by the variable-frequency and variable-speed pressure adjusting device (including a drilling driving rig and the high voltage variable frequency pump) to achieve intelligent control of a construction process;
8. after drilling is performed to a designed depth, the mud pump is closed, the drill bit performs stirring while being lifted, and the stratum state parameters are inverted synchronously, so as to intelligently adjust the lifting speed and rotating speed of a stirring rod;
9. the mud pump is opened if the drill bit is lifted to a position requiring re-spraying and re-stirring, and slurrying is stopped if the drill bit is lifted to 0.5 m above a designed cement-soil pile elevation; and 10. the drilling rig is moved to the next construction position, and the above steps are repeated to complete construction of a jet grouting pile.

Embodiment III

The embodiment discloses an intelligent construction control system for splitting jet grouting mixing piles.

The intelligent construction control system for splitting jet grouting mixing piles includes:
- a real-time perception information acquisition module, configured to: receive real-time perception information from construction information self-perception system, where the real-time perception information includes data of drilling depth, output power of a drilling rig, torque of a drill bit, axial force of a drill rod and pore water pressure of the drill bit;
- a real-time stratum state information prediction module, configured to: input the real-time perception information into the trained machine-learning model for stratum information, establish a nonlinear implicit correspondence between the real-time perception information and construction stratum conditions, and output real-time stratum state information;
- a current optimal construction parameter acquisition module, configured to: input the real-time stratum state information into a trained self-matching machine-learning model for optimal construction parameters, establish a nonlinear implicit correspondence between the real-time stratum state information and optimal construction parameters, and output current optimal construction parameters.

It shall be noted by those skilled in the art that various modules or steps of the present invention can be implemented via a universal computer device, and optionally, can be implemented via a program code that can be executed in a computing device. Therefore, they can be stored in a storage device for execution by the computing device, or can be separately made into various integrated circuit modules, alternatively, multiple modules or steps in them can be made into a single integrated circuit module for implementation. The present invention is not limited to any combination of specific hardware and software.

Although the specific embodiments of the present invention have been described in conjunction with the accompanying drawings, it is not limited within the scope of protection of the present invention. It should be understood that various modifications that can be made without creative labor on the basis of the technical solution of the present invention are still within the scope of protection of the present invention.

What is claimed is:

1. An intelligent construction control method for splitting jet grouting mixing piles, comprising the following steps:
   receiving real-time perception information from a construction information self-perception system, wherein the real-time perception information comprises drilling depth, output power of a drilling rig, torque of a drill bit, axial force of a drill rod and pore water pressure of the drill bit;
   inputting the real-time perception information into the trained machine-learning model for stratum information, establishing a nonlinear implicit correspondence between the real-time perception information and construction stratum conditions, and then outputting real-time stratum state information; and
   inputting the real-time stratum state information into the trained self-matching machine-learning model for optimal construction parameters, establishing a nonlinear implicit correspondence between the real-time stratum state information and optimal construction parameters, and then outputting current optimal construction parameters; specific details are as follows:
   1) data preprocessing: removing data outliers based on a statistical analysis method, and using a regression interpolation method to fill local sparse data;
   2) Feature selection and standardization: evaluating a correlation degree between features and target variables using a chi-square test method, and selecting five features with a highest correlation degree, and converting selected five features to a normal distribution with a mean value of 0 and a variance of 1 using a Z-score standardization method, to make them comparable;
   3) Data division: dividing a database into n datasets with approximate sizes using a K-fold cross validation method;
   4) User-defined kernel function: using a user-defined polynomial kernel function to map the data to a high-dimensional feature space, therefore transferring nonlinear problems to linear problems;
   5) model training and evaluating: performing K-round training to evaluate on the built construction parameter self-matching model, where n−1 datasets in each round are used for training, and remaining datasets are used as a test set, and finally calculating the average value among K-round evaluation results as a performance index of the model, and performing next round of training if not meet the requirement;
   6) optimal construction parameters prediction: inputting real-time stratum state information into a trained self-matching machine-learning model for optimal construction parameters, and obtaining predicted optimal construction parameters through forward propagation;
   the self-matching machine-learning model for optimal construction parameters is a specially designed SVM class model, a kernel function of the model is the user-defined polynomial kernel function.

2. The intelligent construction control method for splitting jet grouting mixing piles according to claim 1, wherein the drilling depth and the output power of the drilling rig are obtained from the drilling rig; and data of the torque of the drill bit, the axial force of the drill rod and the pore water pressure of the drill bit are obtained from a torque sensor, an axial force sensor and a pore water pressure sensor.

3. The intelligent construction control method for splitting jet grouting mixing piles according to claim 1, wherein training the machine-learning model for stratum information specifically comprises:
   building a random forest-DBSCAN integration model;
   obtaining existing geological state information and experimental data, and labeling the stratum state information corresponding to the drilling depth in a classification manner;
   inputting the experimental data and the labeled stratum state information into the random forest-DBSCAN integration model, and clustering the experimental data using a DBSCAN algorithm to train a random forest model;
   evaluating and optimizing the model using a validation set or a cross validation method to obtain the trained machine-learning model for stratum information, namely the trained random forest-DBSCAN integration model; and inputting the real-time perception information into the trained random forest-DBSCAN integration model to obtain an estimated value of the real-time stratum state information.

4. The intelligent construction control method for splitting jet grouting mixing piles according to claim 1, wherein the self-matching machine-learning model for optimal construction parameters is expressed as a mapping between multi-input and multi-output:

$$f:G=f(s)$$

where s is an input vector (i.e., stratum condition), s=$(\alpha_1, \alpha_2, \ldots \alpha_n)$ and $\alpha_1$-$\alpha_n$ represents real-time stratum state information components; and G is an output vector (i.e., optimal construction parameter combination), G=$(\beta_1, \beta_2, \ldots \beta_n)$ and $\beta_1$-$\beta_n$ represents output components.

5. The intelligent construction control method for splitting jet grouting mixing piles according to claim 1, wherein the optimal construction parameter database is the splitting pile construction parameters, comprising water-cement ratio, mud dosage, grouting pressure, grouting speed, drilling speed, lifting speed of the drill rod and rotating speed of a fan blade, obtained from the cloud platform under typical stratum conditions.

6. The intelligent construction control method for splitting jet grouting mixing piles according to claim 1, wherein further comprising: inputting the current matched optimal construction parameters into a construction parameter intelligent adjustment system, and dynamically adjusting the construction parameters to achieve intelligent control of a construction process.

7. An intelligent construction apparatus for splitting jet grouting mixing piles, the intelligent construction apparatus is used to implement the steps of the intelligent construction control method for splitting jet grouting mixing piles according to claim 1, wherein comprising a construction information self-perception system, a control apparatus, and a construction parameter intelligent adjustment system, the construction information self-perception system comprises a drilling rig and multi-source sensing components, the drilling rig is used for detecting drilling depth and output power of the drilling rig; and the multi-source sensing components are used for acquiring data of torque of a drill bit, axial force of a drill rod and pore water pressure of the drill bit;

the control apparatus is used for predicting, outputting, and displaying the real-time stratum state information based on detections from the construction information self-perception system, and then outputting current optimal construction parameters based on the real-time stratum state information; and the construction parameter intelligent adjustment system is used for real-time controlling to a variable-frequency and variable-speed pressure adjusting device based on the current optimal construction parameters.

8. The intelligent construction apparatus for splitting jet grouting mixing piles according to claim 7, wherein the multi-source sensing components comprise a torque sensor and a pore water pressure sensor which are mounted at the drill bit, and an axial force sensor mounted at the bottom of the drill rod; the variable-frequency and variable-speed pressure adjusting device comprises a drilling driving motor and a high voltage variable frequency pump, wherein the drilling driving motor is used for controlling drilling speed, lifting speed of the drill rod and rotating speed of a fan blade; and the high voltage variable frequency pump is used for controlling grouting pressure and grouting speed.

9. An intelligent construction control system for splitting jet grouting mixing piles, comprising a real-time perception information acquisition module, configured to: receive real-time perception information from construction information self-perception system, where the real-time perception information includes data of drilling depth, output power of a drilling rig, torque of a drill bit, axial force of a drill rod and pore water pressure of the drill bit;

a real-time stratum state information prediction module, configured to: input the real-time perception information into the trained machine-learning model for stratum information, establish a nonlinear implicit correspondence between the real-time perception information and construction stratum conditions, and output real-time stratum state information; and a current optimal construction parameter acquisition module, configured to: input the real-time stratum state information into a trained self-matching machine-learning model for optimal construction parameters, establish a nonlinear implicit correspondence between the real-time stratum state information and optimal construction parameters, and output current optimal construction parameters;

1) data preprocessing: removing data outliers based on a statistical analysis method, and using a regression interpolation method to fill local sparse data;

2) Feature selection and standardization: evaluating a correlation degree between features and target variables using a chi-square test method, and selecting five features with a highest correlation degree, and converting selected five features to a normal distribution with a mean value of 0 and a variance of 1 using a Z-score standardization method, to make them comparable;

3) Data division: dividing a database into n datasets with approximate sizes using a K-fold cross validation method;

4) User-defined kernel function: using a user-defined polynomial kernel function to map the data to a high-dimensional feature space, therefore transferring nonlinear problems to linear problems;

5) model training and evaluating: performing K-round training to evaluate on the built construction parameter self-matching model, where n−1 datasets in each round are used for training, and remaining datasets are used as a test set, and finally calculating the average value among K-round evaluation results as a performance index of the model, and performing next round of training if not meet the requirement;

6) optimal construction parameters prediction: inputting real-time stratum state information into a trained self-matching machine-learning model for optimal construction parameters, and obtaining predicted optimal construction parameters through forward propagation;

the self-matching machine-learning model for optimal construction parameters is a specially designed SVM class model, a kernel function of the model is the user-defined polynomial kernel function.

* * * * *